SEARCH ROOM

Aug. 23, 1960 E. J. GARGINI 2,950,345

TELEVISION RELAY SYSTEMS

Filed June 15, 1954 3 Sheets-Sheet 1

INVENTOR
E. J. Gargini
BY
Glascock Downing & Seebold
ATTORNEYS

Aug. 23, 1960 E. J. GARGINI 2,950,345

TELEVISION RELAY SYSTEMS

Filed June 15, 1954 3 Sheets-Sheet 2

INVENTOR
E. J. Gargini
BY Glascock Downing & Seebold
ATTORNEYS

Aug. 23, 1960 E. J. GARGINI 2,950,345

TELEVISION RELAY SYSTEMS

Filed June 15, 1954 3 Sheets-Sheet 3

INVENTOR
E. J. Gargini
BY Glascock Downing & Seebold
ATTORNEYS.

United States Patent Office 2,950,345

Patented Aug. 23, 1960

2,950,345

TELEVISION RELAY SYSTEMS

Eric John Gargini, Yiewsley, West Drayton, England, assignor to Electric & Musical Industries Limited, Hayes, England, a company of Great Britain Filed June 15, 1954, Ser. No. 436,933

Claims priority, application Great Britain June 17, 1953

6 Claims. (Cl. 178—7.5)

Figure 1A:
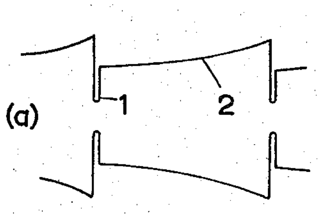

This invention relates to television relay apparatus.

It has been proposed hitherto to operate television relay systems in which television broadcast programmes are received by a programme-distributing unit, demodulated and amplified, and then distributed by cable to a plurality of remotely located terminal receivers. One proposal of this character is described in the specification of co-pending United States application Serial No. 232,577, now Patent No. 2,836,649, granted May 27, 1958, and according to this proposal the received television video signals are re-distributed by the cable on a carrier wave. Moreover, the distributing unit is arranged to generate scanning signals of a special character which are synchronised with the synchronising signals of the broadcast television programme and distributed by the cable on another carrier wave. The object of generating the scanning signals of special character is to enable the scanning circuits at terminal receivers to be simplified, thereby reducing the initial costs and also the maintenance costs of the terminal receivers.

In the proposal described in United States application Serial No. 232,577, the scanning signals comprise frame frequency components on which are super-imposed line frequency components. The frame frequency components may be regarded as comprising substantially rectangular pulses the intervals between which correspond to frame return periods and which have an exponential waveform added to them. The line frequency components are generally of sawtooth waveform, with negative potential excursions of relatively large amplitude between successive long flanks of said sawtooth waveform. The frame deflection at the receiver is effected by a waveform produced by integrating the scanning signals as a whole, whilst the line waveform is derived from the line frequency components of the signals. The arrangement described has the advantage that the carrier wave for the scanning signals can be modulated to a high degree by both the frame frequency components and the line frequency components of the scanning signals. Therefore highly efficient use is made of the carrier wave.

The object of the present invention is mainly to provide more simple and reliable scanning in television relay systems of the general character described in the aforesaid patent specification. The object of another feature of the present invention is to generate improved scanning signals of the general character described in the aforesaid patent specification, which facilitate the employment of simple and reliable scanning circuits.

According to the present invention there is provided television relay apparatus wherein scanning signals are relayed from a distributing unit to at least one television receiver, said scanning signals comprising variations of frame frequency and line frequency components of a substantially sawtooth waveform, and said receiver having a scanning circuit which comprises an integrating circuit and a differentiating circuit to both of which said scanning signals are applied, means for deriving a frame deflecting waveform from the output of the integrating circuit, and means for deriving a line deflecting waveform from the output of said differentiating circuit.

Preferably said scanning circuit comprises a first valve having a control electrode to which the output of the integrating circuit is applied and having a frame deflecting coil connected in the circuit of its output electrode, and a second valve having a control electrode to which the output of the differentiating circuit is applied and having a line deflecting coil connected in the circuit of its output electrode.

Figure 1B:
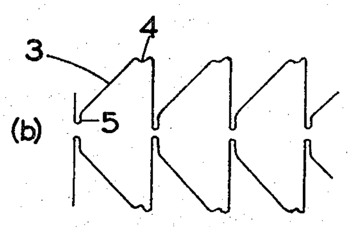
Figure 2A:
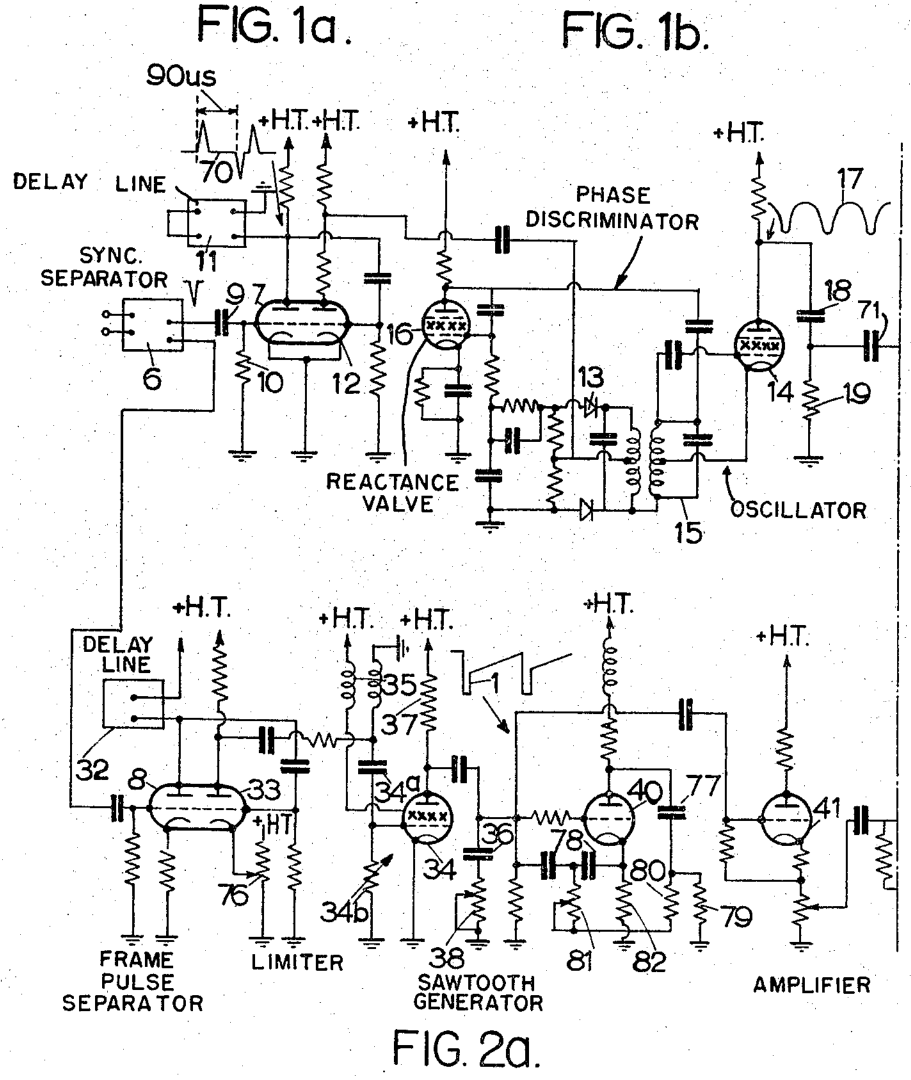
Figure 2B:
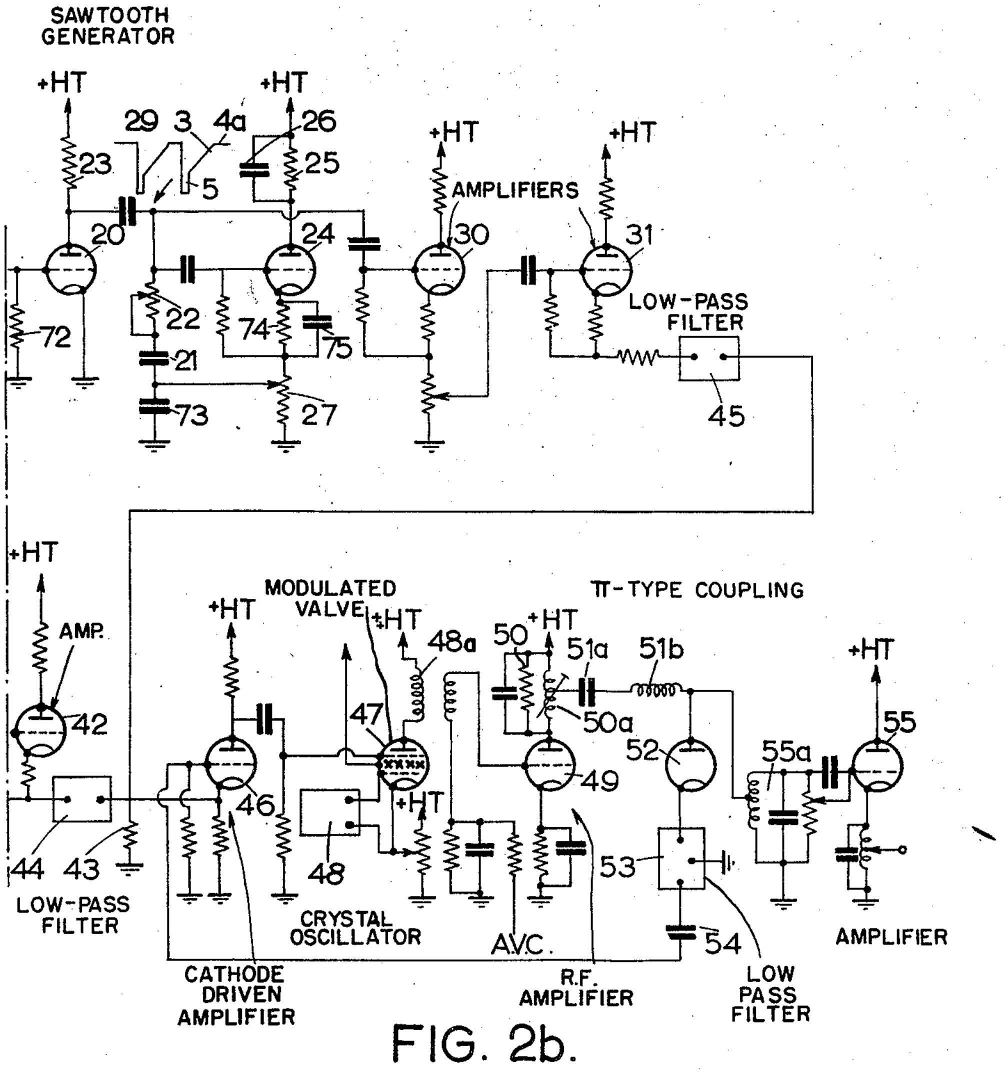

In order that the invention may be clearly understood and readily carried into effect, the invention will be described with reference to the drawings, in which:

Figures 1*a* and 1*b* comprise waveform diagrams illustrating the character of the scanning signal waveform relayed by a distributing unit in accordance with one example of the present invention, Figures 2*a* and 2*b* illustrate partly in block form one example of a scanning signal waveform generator for use in a distributing unit in accordance with the present invention.

Figure 3:
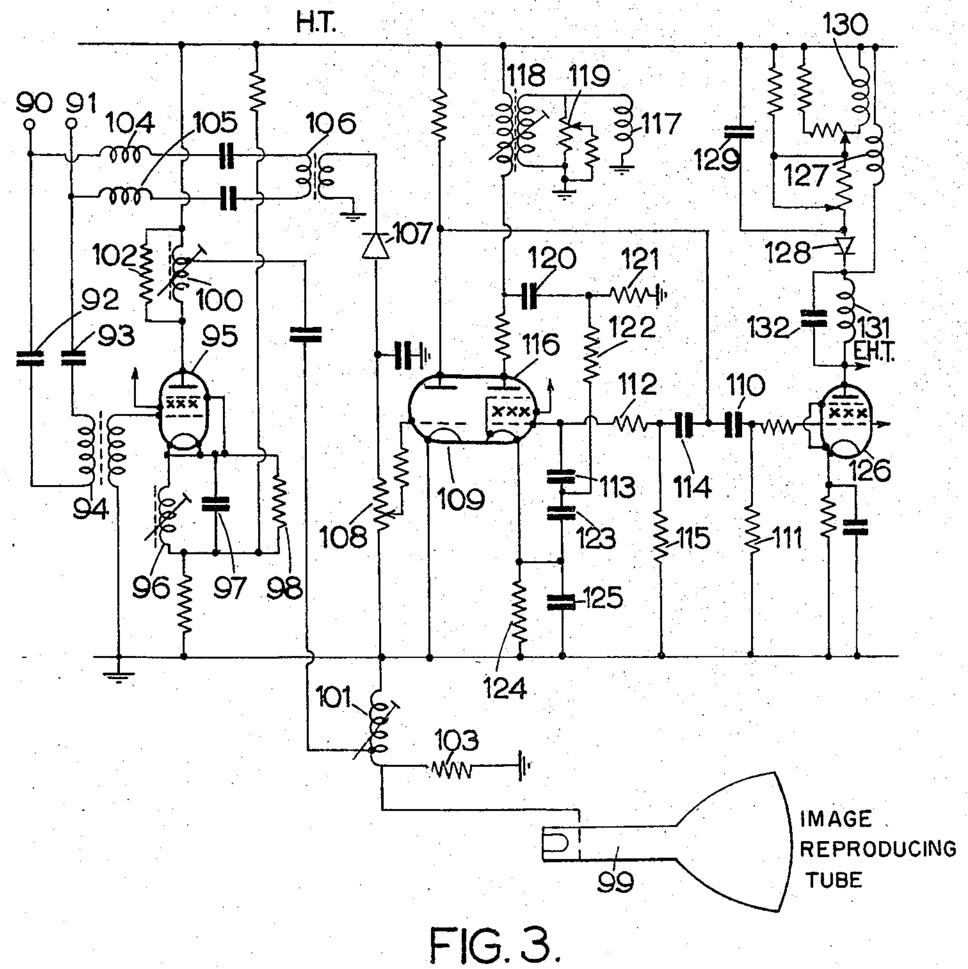

Figure 3 illustrates one example of a terminal receiver for a relay system in accordance with one example of the invention.

Referring to the drawing, Figure 1(*a*) illustrates the envelope shape of the carrier wave employed for distributing scanning signals when the carrier wave has been modulated only by the frame scanning signals of the composite scanning signal waveform. The frame scanning signals are generally of a pulse like character with interruptions 1 between the pulses which are of such depth as to reduce the envelope amplitude to about 15 percent of the peak amplitude of the frame scanning signals. The interruptions 1 correspond to frame return intervals. The pulses have an upward curvature, denoted by the line 2. The pulses can be regarded as including a rectangular component to which is added an exponential waveform. The line frequency scanning signals are of the form shown in Figure 1(*b*) and these signals are of constant amplitude and of a sawtooth character. They comprise a linearly rising portion 3 giving way to a ripple 4 of between 50 and 60 kc./s. frequency at an intermediate point in each line period. Interruptions 5 in the line scanning signals correspond to line return intervals. The time scale in the case of Figure 1(*b*) is of course considerably expanded as compared with Figure 1(*a*). When the frame scanning signals of Figure 1(*a*) and the line scanning signals of Figure 1(*b*) are combined, the line frequency components occurring during the interruptions 1 in the frame scanning signals are considerably reduced in amplitude. During the portion 2 of the frame scanning signals the interruptions 5 of the line scanning signals modulate the carrier wave to the extent of 95 percent at the beginning of the portion 2 and to the extent of 60 percent at the end thereof.

The scanning signal generator illustrated in Figure 2, is included in the distributing unit of the television relay system, and in describing this circuit specific reference will not be made to components such as coupling components and anode load resistances, which are conventional and whose function is obvious. Block 6 represents a conventional amplifier and limiter circuit to which is applied composite video signals and synchronising pulse waveform. It will be understood that the signals applied to the circuit are broadcast television signals picked-up by the distributing unit and fed to the circuit 6 after demodulation and amplification. The circuit 6 suppresses the video signals leaving the synchronising pulses, which are fed in parallel and with negative polarity to two valves 7 and 8. The synchronising pulses are fed to the valve 7 through a differentiating circuit which comprises a capacitor 9 and resistor 10 and which produces alternate negative and positive spikes on the occurrence respectively of the leading and trailing edges of synchronising pulses. The positive spikes are removed by grid current limitation in the valve 7 and the negative spikes produce positive spikes at the anode of this valve which are applied to a short-circuited delay line 11, twice the delay of which is 90 μs. As a consequence each positive spike at the anode of the valve 7 is followed 90 μs. later by a spike of negative polarity. The resultant output waveform set up at the anode of the valve 7 (a fragment of which is denoted by reference 70) is applied to the control electrode of a valve 12 which removes the positive spikes by grid current limitation and amplifies the negative spikes to produce a positive spike output at its anode, 90 microseconds delayed with respect to the synchronising pulses received from 6. In effect the positive spikes at the anode of 12 are produced 10 μs. in advance of the received synchronising pulses and this advance is provided because the video signals are relayed as modulation of the carrier wave of higher frequency than the carrier wave on which the scanning signal waveform is relayed. Consequently the video signals are liable to be delayed in the distributing cable to a greater extent than the scanning signals. There may also be relative delay in filter circuits at the distributing unit and the 10 μs. advance represents the greatest relative delay likely to be encountered and where the delay is less than this, compensation is effected by delaying the scanning signal waveform at the repeaters in the system.

The spikes set up at the anode of the valve 12 are fed to the phase discriminating circuit 13 included in a flywheel scanning circuit which also includes a valve 14 associated with a tank circuit 15 in such manner as to form a cathode-coupled sine-wave oscillator. A reactance valve 16 forms a shunt element of the tank circuit 15 and the output of the discriminator circuit 13 functions to vary the reactance of this valve and thereby the frequency of the oscillator 14, 15, 16 in such manner as to obtain accurate frequency tracking between the oscillator and the line frequency of the television programme, as represented by the frequency of the spikes at the anode in valve 12. The discriminating and oscillator circuits are of conventional and well known construction and will not be further described.

The oscillator sets up at the anode of the valve 14 an output of negative pulses, a fragment of which is indicated by the reference 17, and these negative pulses are applied to a differentiating circuit consisting of a capacitor 18 and resistor 19. The output of the differentiating circuit, consisting of alternate negative and positive spikes are applied to the control electrode of a discharger valve 20 in a sawtooth waveform generator. This generator comprises, in addition to the discharger 20, an intergrating capacitor 21, variable peaking resistor 22, and a charging resistor 23. In operation the valve 20 automatically biasses itself by virtue of coupling capacitor 71 and leak resistor 72 so that it remains cut-off except on the application of positive spikes to its control electrode. On the occurrence of each positive spike, the valve 20 conducts and discharges the condenser 21 to generate a short flank of a sawtooth waveform. During conduction of valve 20, the potential drop at the anode of the valve 20 due to the resistor 22 produces one of the interruptions 5 in the line scanning signals, and the amplitude of these interruptions can be adjusted by varying the magnitude of the resistor 22. The waveform at the anode of the valve 20 is applied to the control electrode of a shaping circuit including a valve 24 having the parallel combination of resistor 25 and capacitor 26 in its anode lead and having a feedback resistor 27 in its cathode lead, a sliding tap on the resistor 27 being connected to the lower electrode of the integrating capacitor 21. The valve 24 is a triode valve and its anode load 25, 26 emphasises the low frequency components in its anode potential waveform. This in turn produces de-emphasis of the low frequency components in the anode current waveform and the corresponding potential waveform set up across the cathode lead resistor 27. Consequently by adjusting the setting of the tap on resistor 27, control of the linearity of the sawtooth waveform at the control electrode of the valve 24, and thus at the anode of the valve 20 can be achieved. The negative feedback from 27 is applied over the capacitor 73. A fragment of the waveform generated at the anode of the valve 20 is denoted by the reference 29, and it comprises a linearly rising part corresponding to the part 3 in Figure 1(*b*) and a relatively flat part **4*a* on which the 50 to 60 kc./s. ripple 4 is subsequently superimposed. The part 4*a* is produced by grid current flow in a valve 30. The interruptions 5 follow the parts 4*a* and the shaping circuit including the valve 24 has the effect of providing a relative sharp transition from the interruptions 5 to the linear parts 3. The waveform at the anode of the valve 20 is fed to the amplifier valve 30 and thence to a further amplifier valve 31, the output from the first of these being taken from an adjustable tap on a resistor in the cathode circuit of the valve 30, as shown, so that the amplitude of the line scanning signals can be adjusted without introducing distortion. The valves 30 and 31 are connected to operate as cathode followers and the second valve 31** acts as a combining stage as will hereinafter appear.

As aforesaid, the synchronising pulses from the circuit 6 are also applied to a valve 8 Figure 2(*a*) and this valve has a delay line 32 in its anode circuit to cause the valve 8 to function as a frame pulse separator, working on a delay line principle. Thus, the broad pulses which constitute the frame synchronising pulses in the broadcast waveform have superimposed on them reflected pulses from the delay line 32 whereas narrow line synchronising pulses do not. The resultant output from the anode of the valve 8 is fed to a limiter valve 33 which conducts only in response to superimposed pulses. The limiting level in the valve 33 is set by tapping the cathode of the valve on a potential divider 76. Therefore its anode circuit has a pulse output only when the frame synchronising pulses occur, the pulse output having a negative polarity. The anode circuit of valve 33 is coupled to the control electrode of a valve 34 by a differentiating circuit consisting of a capacitor **34*a* and resistor 34*b*. The valve 34 has its screen electrode regeneratively coupled by a transformer 35 to its control electrode to form a blocking oscillator circuit. The positive spikes produced at the control electrode of the valve 34 by the differentiating circuit 34*a*, 34*b* on the occurrence of the trailing edge of a pulse at the anode of the valve 33 fires the blocking oscillator in known manner at frame frequency and discharges a capacitor 36 which is charged via a resistor 37 during the intervals when the valve 34 is blocked. The capacitor 36 is moreover, connected in series with a variable peaking resistor 38 which produces the interruptions 1** in the frame scanning signals of Figure 1(*a*). The waveform set up at the anode of the valve 34 is linearised in a shaping circuit including valve 40 and is finally amplified in two cathode follower stages 41, 42. The shaping circuit is of the kind described in the specification of United States Patent No. 2,241,762 and comprises capacitors 77 and 78 and resistors 79, 80, 81 and 82. The components 77 and 79 form a high pass filter and 80, 81, 78 and 82 form a low pass filter. Resistor 81 is variable and allows the relative proportions of the high and low frequency components in the feed back voltage to be varied. The choke in the anode circuit of valve 40 is used for setting up pulses of frame frequency which are taken, by a lead not shown, to an automatic gain control circuit for the broadcast receiving channel of the distributing unit. There the pulses act as gating pulses. The stages 41 and 42 are similar to the stages 30 and 31. The stage 42 has a cathode resistor 43 which also functions as the cathode resistor for the valve of stage 31. A low pass filter 44 is connected between the cathode of the valve 42 and the resistor 43 and similarly a low pass filter 45 is connected between the cathode of valve 31 and the resistor 43. The low pass filter 44 cuts off in the region of 3 kc./s. and prevents line signal components from passing into the frame circuits. The low pass filter 45 cuts off in the region of 300 kc./s. and its function is to prevent high harmonics of the line signals beating with the carrier wave (which as will hereinafter appear is modulated with the combined scanning signals) to produce beat frequency signals which would be liable to interfere with line scanning signals.

The line frequency and frame frequency scanning signals combined across the resistor 43 are fed to the cathode of a cathode driven amplifying valve 46. The amplified output from the anode circuit of the valve 46 is fed to the suppressor electrode of a modulated valve 47 which has carrier oscillations, of frequency 984.7 kc./s., fed to its control electrode from a conventional crystal oscillator shown merely in block form and indicated by a reference 48. The scanning signals fed to the suppressor electrode of the modulated valve 47 are arranged to be of such amplitude that the anode current of the modulated valve is substantially cut-off during the intervals corresponding to the interruptions 1 in the frame scanning signals. In this way the line scanning signals are reduced to a very low level during said intervals. Moreover, this suppression is carried out to some extent in the grounded grid amplifier valve 46. The output of modulated carrier frequency signals from the valve 47 are fed by a transformer **48*a* to a radio frequency amplifying stage including a valve 49. The output of the R.F. amplifying stage is set up across a tuned circuit 50 and a suitable fraction of the output is taken from a tap 50*a* and applied via capacitor 51*a* and inductance 51*b* to the input circuit 55*a* of a cathode follower valve 55. The circuits 50, 55*a* and the elements 51*a* and 51*b* constitute a $\pi$-type coupling circuit of appropriate bandwidth. A diode rectifying valve 52 has its anode tapped on an intermediate point of the coupling filter, and the load circuit of the rectifying valve 52 includes a low pass filter 53 whose output is fed by a capacitor 54 to the control electrode of the cathode driving amplifying valve 46. The signals so fed to the control electrode of the valve 46 consist of modulation frequency components of the output of valve 49 and provide negative feedback which linearises the modulation effected in the modulated valve 47. The low pass filter 53 prevents feedback of the carrier frequency signals and its pass range is approximately that of the modulation frequency band. Consequently the filter commences to attenuate at frequencies of the order of 50 to 60 kc./s., so there is a reduction of negative feedback at these frequencies giving rise to emphasis of the highest components of the line scanning signals. This emphasis is instrumental in producing the ripple 4** in the waveform of Figure 1(*b*). The advantage derived from this ripple will be mentioned subsequently. The series capacitor 54 in the feedback path to the valve 46 reduces the feedback at lower frequencies and produces the upward curvature of the portions 2 of frame scanning signals shown in Figure 1(*a*). The output taken from the cathode of the valve 55 provides the final output of scanning signals.

The signals applied to the valve 49 are also applied to a further rectifying circuit, not shown, which generates an AVC voltage for the valve 49.

It will be appreciated that the carrier wave modulated with the scanning signals derived from the circuit illustrated in Figure 2 are relayed by a cable channel to television receivers normally in dwelling houses. Moreover it will be appreciated that vision signals are relayed to the receivers by the same cable channel on a carrier wave of higher frequency such that the frequency spectra of the scanning signal carrier wave and the vision signal carrier wave do not overlap. Figure 3 illustrates a suitable construction for a television receiver intended for use in the relay system. Terminals 90 and 91 are the terminals at which the carrier waves modulated respectively with the scanning signals and the vision signals are received from the cable channel. The carrier wave modulated with the vision signals is fed via the capacitors 92 and 93 and transformer 94 to the control electrode of detecting and amplifying valve 95. The valve 95 has a cathode circuit comprising inductor 96, capacitor 97 and resistor 98 which filters signals of the frequency of the scanning signal carrier wave from the vision signal channel of the receiver. The vision signals are applied to the control electrode of the cathode ray tube 99 of the receiver from a filter circuit which comprises two inductors 100 and 101 and terminating resistors 102 and 103. The filter circuit is tuned by stray capacities.

The capacitors 92 and 93 are blocking capacitors at the frequency of the carrier wave modulated with the scanning signals, and this latter carrier wave is applied via high frequency chokes 104 and 105 and transformer 106 to detector 107 which has a load resistor 108. The chokes 104 and 105 act as stoppers for the vision signal carrier wave. The detected scanning signals are applied to the control electrode of an amplifying valve 109, and the amplified scanning signals set up at the anode of the valve 109 are fed in parallel to a high pass circuit and an integrating circuit. The high pass circuit comprises capacitor 110 and resistor 111 while the integrating circuit comprises resistor 112 and capacitor 113. Capacitor 114 is a D.C. blocking capacitor and 115 is its leak resistor. Components 112 and 113 integrate the scanning signals as a whole to generate the frame deflecting waveform for the tube 99, the interruptions 1 serving to reset the integrating circuit and produce the return strokes of the waveform. The integrated output of components 112 and 113 is applied to the control electrode of pentode valve 116 which has the frame deflecting coil 117 coupled in its anode circuit by the transformer 118. Variable resistor 119 controls the amplitude of the frame deflecting waveform. The valve 116 has a negative feedback connection from its anode to its control electrode for linearising a frame deflecting waveform, the feedback circuit comprising capacitor 120, resistor 121, resistor 122 and capacitor 123. The feedback circuit is of the same type as that used in connection with the valve 40 in Figure 2. Resistor 124 by-passed by capacitor 125 provides bias for the valve 116. The output of the high pass circuit 110, 111 is applied to the control electrode of pentode valve 126, which has the line deflecting coil 127 in its anode circuit. The coil 127 is connected in parallel with damping diode 128 and storage condenser 129, and a focussing circuit for the cathode ray tube 99 is connected in parallel with the capacitor 129 and is energised thereby. The focussing coil is denoted by 130 and it is associated with resistors as shown, these resistors having the function of adjusting the focus and the raster aspect ratio as described in United States application Serial No. 352,-004 now Patent No. 2,797,358, granted June 25, 1957. Means not shown, for generating the EHT for the cathode ray tube 99 are also coupled to the anode circuit of valve 126, and inductor 131 tuned by capacitor 132 is employed to step up the voltage set up at the anode of the valve 126 during line return strokes.

The high pass circuit 110 and 111 transmits the line frequency components of the scanning signals and produces negative potential excursions at the control electrode of the valve 126 corresponding to the interruptions 5 (Figure 1(*b*)) of sufficient amplitude to cut-off the valve 126 and thereby facilitate the generation of an adequate EHT supply. The linearity of the sawtooth waveform current produced in coil 127 is not affected by the ripple 4 during the latter part of each cycle of the line scanning signals since the control electrode of the valve 126 takes current before the linear part 3 ends. The termination of the linear part 3 at an intermediate point enables more effective use to be made of the carrier wave for the scanning signals, and moreover the ripple 4 sharpens the cut-off of the valve 126 produced by the interruptions 5. This enhances the EHT which can be derived from the line scanning circuit. It is arranged that the natural frequency of the ringing circuit 131, 132 is equal to the frequency of the ripple 4, thereby further increasing the EHT which is obtainable. The ripple 4 does not produce bands in reproduced pictures since it occurs only at a time when the valve 126 is taking control electrode current. The upwardly curved exponential part 2 of the frame scanning signals (Figure 1(*a*)) serve to compensate for base loss in the transformer 118.

What I claim is:

1. In television relay apparatus including means for generating a scanning waveform comprising a sawtooth signal of line frequency superimposed on an impulsive component of frame frequency with intervals between successive impulses of said impulsive component corresponding to frame return strokes, a receiver remotely located from said generating means and including a cathode ray tube, and means for relaying said scanning waveform from said generating means to said receiver; a scanning circuit in said receiver for said cathode ray tube comprising a pair of input terminals, means for applying said scanning waveform to said input terminals, said scanning circuit comprising an integrating circuit for integrating the scanning waveform applied to said input terminals to derive a frame deflecting waveform, means responsive to the output of said integrating circuit for deflecting the beam of said cathode ray tube in one co-ordinate direction, a high pass filter for separating said sawtooth component from the scanning waveform applied to said input terminals, and means responsive to said separated sawtooth component for deflecting the beam of said cathode ray tube in another coordinate direction.

2. In television relay apparatus comprising a distributing unit including means for generating a scanning waveform comprising a sawtooth component of line frequency superimposed on an impulsive component of frame frequency with intervals between successive impulses of said impulsive component corresponding to frame return strokes, at least one television receiver, and means for simultaneously relaying received video signals and said scanning waveform to said receiver, and said receiver comprising a cathode ray image reproducing tube and means for applying relayed video signals to said tube to modulate the beam thereof; a scanning circuit in said receiver for said cathode ray tube comprising two input terminals, means for applying said scanning waveform to said input terminals, said scanning circuit comprising a resistor and capacitor connected in series as an integrating circuit from one input terminal to the other, a capacitor and a resistor connected in series as a high pass filter from said one input terminal to the other, said integrating circuit being responsive to the scanning waveform applied to said input terminals to produce a frame deflecting waveform across said first capacitor and said high pass filter being responsive to the scanning waveform applied to said input terminals to separate said sawtooth waveform from said scanning waveform and produce a line deflecting waveform across said second resistor, means responsive to the frame deflecting waveform produced across said first capacitor for deflecting the beam of said cathode ray tube in the vertical direction, and means responsive to the sawtooth component produced across said second resistor for deflecting the beam of said cathode ray tube in the horizontal direction.

3. Relay apparatus according to claim 1, said means for generating said scanning waveform including means for producing an upward exponential curvature of said impulsive component of frame frequency.

4. Television relay apparatus including means for generating a scanning waveform comprising a sawtooth component of line frequency superimposed on an impulsive component of frame frequency with intervals between successive impulses of said impulsive component corresponding to frame return strokes, means for producing a ripple component of higher than line frequency during the latter part of each forward stroke of said sawtooth component, a television receiver remotely located from said generating means and including a cathode ray tube, means for simultaneously relaying received video signals and said scanning waveform to said receiver, means for applying relayed video signals to said tube to modulate the beam thereof, a scanning circuit in said receiver for said tube, said scanning circuit comprising a pair of input terminals, means for applying said scanning waveform to said input terminals, said scanning circuit further comprising an integrating circuit and a high pass filter connected in parallel to receive the scanning waveform applied to said input terminals, said integrating circuit integrating said scanning waveform to derive a frame deflecting waveform, an amplifying valve connected to amplify said frame deflecting waveform, beam deflecting means responsive to the amplified frame deflecting waveform to deflect the beam of said cathode ray tube in one co-ordinate direction, said high pass filter separating said sawtooth waveform component and said ripple component from said scanning waveform, a line deflecting coil, an amplifying valve having an input electrode connected to receive the sawtooth and ripple components separated by said high pass filter and an output electrode to which said coil is connected, said valve having circuit connections for producing a sawtooth waveform current in said coil to deflect the beam of said cathode ray tube in another co-ordinate direction, and means including a resonant circuit tuned to the frequency of said ripple component and coupled to said output electrode for deriving a high voltage for said cathode ray tube in response to return strokes of said sawtooth waveform.

5. Television relay apparatus including means for generating a scanning waveform comprising a sawtooth waveform of line frequency superimposed on an impulsive component of frame frequency with intervals between successive impulses of said impulsive component corresponding to frame return strokes, a receiver remotely located from said generating means and including a cathode ray tube and means for relaying said scanning waveform from said scanning means to said receiver, a scanning circuit in said receiver for said cathode ray tube comprising a pair of input terminals, means for applying said scanning waveform to said input terminals, said scanning circuit comprising an integrating circuit for integrating the scanning waveform applied to said input terminals to derive a frame deflecting waveform, a valve having a control electrode and an output electrode with said control electrode coupled to said integrating circuit to receive said frame deflecting waveform, a frame deflecting coil for said cathode ray tube connected to said output electrode to deflect the beam of said cathode ray tube in one co-ordinate direction in response to said frame deflecting waveform, a high pass filter for separating said sawtooth component from the scanning waveform applied to said input terminals, a second valve having a control electrode and an output electrode with the control electrode of said second valve coupled to said high pass filter to receive the output thereof, and a line deflecting coil for said cathode ray tube connected to the output electrode of said second valve to deflect the beam of said cathode ray tube in another co-ordinate direction in response to said sawtooth component.

6. Relay apparatus according to claim 5, said means for generating said scanning waveform including means for terminating the rise of the sawtooth component at an intermediate point during each forward stroke thereof, and said second deflecting means comprising circuit connections for biasing said valve to cause said control electrode thereof to take current during each long flank of said sawtooth signals before the occurrence of said intermediate point thereof.

References Cited in the file of this patent

UNITED STATES PATENTS 2,836,649 Gargini ---------------- May 27, 1958

FOREIGN PATENTS 156,339 Australia -------------- Aug. 23, 1951